(12) United States Patent
Liubakka et al.

(10) Patent No.: US 8,642,933 B2
(45) Date of Patent: Feb. 4, 2014

(54) MICROWAVE PELLET FURNACE AND METHOD

(75) Inventors: Gary M. Liubakka, Hibbing, MN (US); Timothy L. Sullivan, Nashwauk, MN (US); Daniel E. Lamphere, Hibbing, MN (US); Gary J. Corradi, Hibbing, MN (US); Kendall J. Dykhuis, Hibbing, MN (US)

(73) Assignee: Phoenix Environmental Reclamation, Hibbing, MN (US)

( * ) Notice: Subject to any disclaimer, the term of this patent is extended or adjusted under 35 U.S.C. 154(b) by 606 days.

(21) Appl. No.: 12/761,359

(22) Filed: Apr. 15, 2010

(65) Prior Publication Data
US 2010/0264136 A1 Oct. 21, 2010

Related U.S. Application Data

(60) Provisional application No. 61/169,563, filed on Apr. 15, 2009.

(51) Int. Cl.
*H05B 6/64* (2006.01)
*C21B 11/08* (2006.01)
*C21B 11/10* (2006.01)
*C22B 4/00* (2006.01)
*C22B 9/22* (2006.01)

(52) U.S. Cl.
USPC ............................ 219/680; 219/683; 75/10.13

(58) Field of Classification Search
None
See application file for complete search history.

(56) References Cited

U.S. PATENT DOCUMENTS

| | | |
|---|---|---|
| 2,946,657 A | 7/1960 | Reynolds, Jr. |
| 3,992,287 A | 11/1976 | Rhys |
| 4,313,573 A | 2/1982 | Goldberger et al. |
| 4,321,089 A | 3/1982 | Kruesi et al. |
| 4,324,582 A | 4/1982 | Kruesi et al. |
| 4,376,034 A | 3/1983 | Wall |
| 4,419,214 A | 12/1983 | Balint et al. |
| 4,655,276 A | 4/1987 | Bird et al. |
| 4,880,578 A | 11/1989 | Holcombe et al. |
| 5,003,144 A | 3/1991 | Lindroth et al. |
| 5,131,941 A * | 7/1992 | Lemelson ................... 75/10.19 |
| 5,211,923 A | 5/1993 | Harkness et al. |
| 5,280,149 A | 1/1994 | Schneider et al. |
| 5,393,320 A | 2/1995 | Gomez |
| 5,397,530 A | 3/1995 | Narasimhan et al. |
| 5,824,133 A | 10/1998 | Tranquilla |

(Continued)

OTHER PUBLICATIONS

Chen, T.T., "The Relative Transparency of Minerals to Microwave Radiation," Canadian Metallurgical Quarterly, vol. vol. 23, No. 3. pp. 349-351 (1984).

(Continued)

*Primary Examiner* — Johannes P Mondt
(74) *Attorney, Agent, or Firm* — Dicke, Billig & Czaja, PLLC

(57) ABSTRACT

One aspect is a microwave furnace including a conveyor for conveying a first material layer, and a second material layer carried on the first material layer, through the furnace. A microwave heating zone is configured for heating the second material layer with a microwave generator as the conveyor conveys the layers through the microwave heating zone. The second material layer consists of a metal-containing material. A direct heat zone is configured for heating the second material layer with a direct heat source as the conveyor conveys the layers through the direct heat zone. A discharge is provided for discharging the material layers out of the microwave furnace.

11 Claims, 2 Drawing Sheets

(56) References Cited

U.S. PATENT DOCUMENTS

| | | | |
|---|---|---|---|
| 5,858,037 A | 1/1999 | Jayan et al. | |
| 5,911,885 A | 6/1999 | Owens | |
| 6,104,015 A | 8/2000 | Jayan et al. | |
| 6,211,499 B1 | 4/2001 | Morrow et al. | |
| 6,277,168 B1 | 8/2001 | Huang et al. | |
| 6,669,756 B2* | 12/2003 | Urabe et al. | 75/484 |
| 6,712,298 B2 | 3/2004 | Kohlberg et al. | |
| 6,923,328 B2 | 8/2005 | Birken | |
| 7,459,006 B2 | 12/2008 | Ridler | |
| 7,476,829 B2 | 1/2009 | Kingman | |
| 2003/0132227 A1* | 7/2003 | Geisler et al. | 219/700 |
| 2005/0092657 A1* | 5/2005 | Birken | 209/39 |
| 2007/0209480 A1* | 9/2007 | Eisele et al. | 75/560 |
| 2008/0087135 A1* | 4/2008 | Hwang et al. | 75/10.13 |
| 2009/0119981 A1* | 5/2009 | Drozd et al. | 44/544 |
| 2010/0263482 A1 | 10/2010 | Liubakka | |
| 2010/0263483 A1 | 10/2010 | Liubakka | |
| 2010/0264241 A1 | 10/2010 | Liubakka | |

OTHER PUBLICATIONS

Vorster, W., "The Effect of Microwave Radiation upon the Processing of Neves Corvo Copper Ore," International Journal of Mineral Processing, vol. 63, pp. 29-44 (2001).

The Office Action for U.S. Appl. No. 12/761,361 mailed Jul. 19, 2011 (14 pages).

The Notice of Allowance for U.S. Appl. No. 12/761,362 mailed Jul. 21, 2011 (14 pages).

* cited by examiner

MICROWAVE PELLET FURNACE AND METHOD

CROSS-REFERENCE TO RELATED APPLICATIONS

This patent application claims priority under 35 U.S.C. §119(e) to U.S. Provisional Patent Application Ser. No. 61/169,563 entitled "RECLAMATION SYSTEM," having a filing date of Apr. 15, 2009 and is incorporated herein by reference. This Patent Application is also related to Utility Patent Application filed on even date herewith, entitled "SYSTEM AND METHOD FOR RECOVERING MINERALS" having application Ser. No. 12/761,362.

BACKGROUND

One aspect relates to oxidizing or reducing minerals by utilizing one or more fluxing, oxidizing or reducing, and binding agents mixed with metal ore and heated with microwaves to produce a metallized product. More specifically, one aspect relates to the reduction of iron ore to metallic iron by using a fluxing agent, a reducing agent, and a binder to produce an unfired pellet or briquette, which is then heated with microwaves to produce a metallic nugget or pellet, with a slag byproduct.

Currently, a significant amount of the world's crude pig iron is produced by pelletizing iron ore and subsequently reducing the ore pellets in blast furnaces. Current practice requires that finely ground iron ores be mixed with fluxes and binders, then be formed into round pellets. The iron ore pellets are fired in large ovens (indurated) to prepare them for use as blast furnace feed. The fired ore pellets are shipped to large blast furnaces and subsequently reduced to pig iron. This is a very energy intensive process requiring large, expensive pellet plants and blast furnaces.

For these and other reasons, there is a need for the present embodiments.

SUMMARY

One aspect includes utilization of the microwave energy absorbing properties of iron ores to produce crude pig iron with lower energy consumption and with a compact and mobile facility. The portability of the process allows utilization of both mined iron ores and many waste products containing iron ores in smaller quantities and with a reduced infrastructure footprint and costs.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
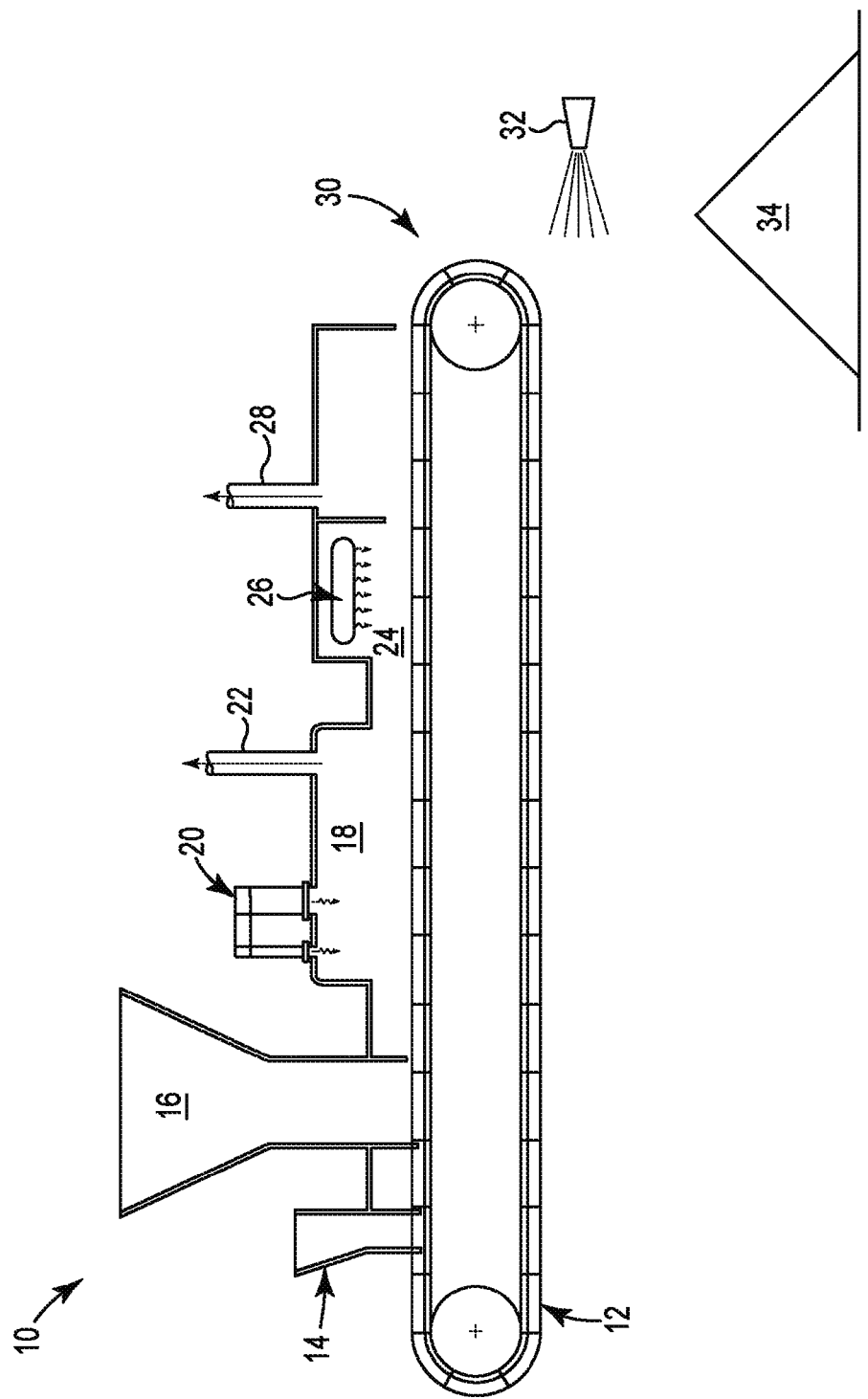
FIG. 1 illustrates a microwave furnace for reducing metal ore pellets in accordance with one embodiment.

FIG. 1 illustrates microwave pellet furnace 10 in accordance with one embodiment. In one embodiment, furnace 10 includes a conveyor configured to transport metal-containing material through a microwave furnace equipped with an auxiliary radiant heat source for treating, reducing, or oxidizing minerals.

In one embodiment, furnace 10 includes conveyor 12. Conveyer 12 is configured to transport metal-containing material through a microwave heating zone 18 and a direct heat zone 24 to a drop zone 30. Microwave generators 20 are located in microwave zone 18 and a direct heat source 26 is located in the direct heat zone 24. Microwave zone 18 includes microwave zone vent 22 and direct heat zone 24 includes direct heat zone vent 28

In one embodiment, conveyor 12 within furnace 10 is a horizontal in-line conveyor for transporting metal-containing material introduced to furnace 10. In one embodiment, conveyor 12 is made of high-temperature resistant, microwave transparent material, such as Kevlar, and it is configured to transport metal-containing material throughout the process. 10. In one embodiment, furnace 10 is configured with a rotary hearth, rather than horizontal conveyor, for transporting material through the heating zones.

In one example, a first material layer on conveyor 12 is an insulating and relatively microwave transparent material. In one embodiment, the first material layer is introduced on conveyer 12 via first material feed 14 to form a hearth layer. This first material layer protects conveyor 12 from the heat of a nugget-forming process and aids further in the reduction process, as will be described further below.

In one embodiment, the first layer of material is introduced onto conveyer 12 via first material feed 14 and a second layer of material is introduced onto conveyer 12 via second material feed 16. In one embodiment, the second layer of material includes a metal-containing material. Conveyer 12 then conveys the first and second layers of materials through microwave heating zone 18 and then through direct heat zone 24, where they are heated to at least the melting temperature of one of the metals in the metal-containing material. The materials are then conveyed to drop zone 30 and cold water spray 32 is configured to hit the materials as they come off conveyor 12. The materials then fall to material discharge 34 for subsequent processing.

In one embodiment, furnace 10 is used in the reduction of iron ore to metallic iron. In one embodiment, the first material layer includes crushed limestone that is introduced at first material feed 14. The crushed limestone creates a hearth bed layer on conveyor 12.

In one embodiment, iron ore is mixed and combined with a fluxing agent, a reducing agent, and a binder in order to produce an unfired pellet or briquette. In one embodiment, the second material layer includes this unfired iron ore pellet, which is introduced into the furnace 10 at second material feed 16 as an iron ore pellet layer. The iron ore pellet layer is in one case introduced over the limestone hearth bed layer on conveyor 12. In one example, the iron ore pellet layer is composed of unfired (green) iron ore pellets. The pellets are transported on the hearth layer by conveyer 12.

In one embodiment, crushed limestone insulates the conveyor 12 from the heat of the reducing/melting iron ore pellets and from the heat of direct heat source 26. The crushed limestone hearth bed also keeps the iron ore pellets from sticking to the conveyer 12 as they are processed and discharged. In one embodiment, the limestone will also have a minor role as additional fluxing agent for the iron ore pellets in the heating process. Some limestone ($CaCO_3$) may decompose and provide a small amount of CO as a reducing gas.

In one embodiment, the iron ore pellets are heated with microwave radiation from microwave generators 20 in microwave heating zone 18, and then with additional heat from heat sources 26 at direct heat zone 24 until the iron ore pellets are reduced to crude pig iron and slag. In one example, the iron ore to be reduced is taconite ore composed of hematite and magnetite. In one example, the fluxing agent is limestone, the reducing agent is coal, and the binder is bentonite. In one example, the iron ore pellet is heated until the pellet is reduced to greater than 92% metallization.

Conveyer 12 transports the iron ore pellets on the limestone hearth layer into microwave heating zone 18 and under microwave generators 20. While in microwave heating zone 18, the iron ore is heated, via microwave absorption, sufficiently to begin reduction and metallization. As the iron ore in the pellet is reduced, the metallic iron consolidates at the bottom of the pellet. Also as the pellet is reduced, gangue minerals in the pellet, such as silica, are forced to the surface of the pellet, forming a slag. The limestone hearth layer also aids in containing the ore, binder, reductant, flux, and resulting molten iron and slag as the pellet is heated and reduced.

In some examples, the iron ore has not been fully reduced after passing through microwave zone 18, or in some instances, additional heat is needed to complete the consolidation of metallic iron and separation of slag. In such cases, more heat is added in direct heat zone 24. In one embodiment, additional heat is provided by heat source 26, which in one example is a natural gas burner. The efficiency of microwave energy absorbtion of most materials, including iron ores, changes as these materials heat up. The use of supplemental heat from a non-microwave source, such as heat source 26, extends the reduction and melting time for the iron ore pellets, while allowing high volumes of iron ore pellets to pass through the microwave heating zone 18. In one embodiment, most of the heating of the iron ore pellets will occur in the microwave heating zone 18, but providing the supplemental heat from heat source 26 reduces problems with excessive 'thermal runaway," a sometimes destructive and problematic phenomenon associated with microwave heating.

In some embodiments, some of the materials in the iron ore pellets introduced into furnace 10 are relatively transparent to microwaves. As such, in one example, microwave generators 20 in microwave heating zone 18 are used to heat one or more of the materials in the iron ore pellets, for example magnetite ($Fe_2O_3$), to its melting point. Then, the heat source 26 in direct heat zone 24 is used to bring the microwave transparent materials in the pellet, for example silica ($SiO_2$), to their respective melting points.

In some embodiments, heat source 26 in direct heat zone 24 may be needed due to varied efficiency of microwave absorption of differing minerals at differing temperatures and of the same mineral with differing crystalline structures (for example, hematite, $Fe_2O_3$, occurs with several different crystal structures: earthy, micaceous, hexagonal, rhombohedral, botryoidal, polysynthetically twinned, etc.). In one example, after microwave heating zone 18, heat source 26 in direct heat zone 24 provides additional heat to the pellets to complete metallization and slag formation. In another example, a heat source may be used before microwave heating zone 18 in order to increase the mineral's ability to absorb microwave radiation. Some minerals more readily absorb microwave energy when heated well above room temperature. In some examples, it may also be required to dry or thaw wet or frozen material.

Once the iron ore is sufficiently reduced and metallized, the materials from conveyer 12 are dropped at drop zone 30. A cold water spray 32 is configured to contact the metalized, slag-covered pellets as they come off conveyer 12. Cold water spray 32 cools the discharged pellets rapidly, causing the brittle cooled slag to fracture and violently separate (or "spall") from the more ductile cooled iron as it falls to material discharge 34. Subsequent processing cleans the iron pellets and removes the slag fragments and the hearth layer limestone. In one example, subsequent mineral processes such as screens or separators are used and will include recycling of the limestone for a hearth layer.

In one alternative embodiment, furnace 10 is used in the roasting of certain metals through the heating process, rather than in reduction. For example, heating with furnace 10 can be done to reduce the metal oxide to metal (as with iron oxides). Some metal ores, such as Cuprite ($Cu_2O$), can be introduced into furnace 10 and heated to at least a temperature where rapid reduction of the ore to a metal occurs. Similarly, some metal ores can be introduced into furnace 10 and heated to at least a temperature where rapid oxidation of the ore to a metal or metal oxide occurs. In one example, for covellite, $CuS+1.5O_2=CuO+SO_2$. The metal oxide can then be reduced, acid leached and electroplated, or otherwise treated to recover the metal.

In one embodiment, the use of microwave energy for heating iron ores results in relatively low energy consumption. As such, furnace 10 in one embodiment is a compact and mobile unit. The portability of furnace 10 allows utilization of mined iron ores and many waste products containing iron ores in smaller quantities and with a reduced infrastructure footprint.

In one embodiment, microwave generators 20 within microwave pellet furnace 10 are operated in a spectrum of microwave frequencies from 300 megahertz to 300,000 megahertz. In addition, ultrasonic frequencies can be used to supplement the microwave frequencies, and in one embodiment, such ultrasound frequencies are 16,000 hertz and higher. In one embodiment, microwave generators 20 actually comprise a plurality of microwaves and/or also include the use of ultrasound frequency simultaneously or in series within one furnace 10.

In one embodiment, ultrasound vibration is used to assist the coalescence and consolidation of like minerals within the microwaved and/or auxiliary heated pellets. In one example, iron ore pellets consisting of reduced taconite iron ore, molten iron forms a dense core as the less dense silica is forced away from the forming core of iron, and flows toward the exterior of the pellet, and forms a slag. Ultrasound energy can be used to increase the speed of the coalescing of slag and reduced iron.

In some embodiments, microwave pellet furnace 10 is configured to operate with a reducing atmosphere in microwave zone 18 and direct heat zone 24 in order to assist in reduction of ores. In one example, microwave pellet furnace 10 is configured to operate with an oxygen rich atmosphere in order to assist in oxidation of ores.

In one embodiment, microwave pellet furnace 10 is configured for use with minerals that are not pelletized and/or blended with other minerals or other components. In one such example, furnace 10 can be used to process $FeS_2$ (pyrite, marcasite) minerals that have been previously screened and sized.

In one embodiment, microwave pellet furnace 10 is configured for processing minerals and contaminated materials (e.g. soils from Superfund Sites), not necessarily to process minerals, but to reduce, oxidize, or volatilize all or some components of the raw material and render it a more benign, useful, or recyclable material. In such cases, the furnace process gases drawn off by the vent and exhaust systems can be contained, processed, and/or treated to meet environmental remediation requirements.

Figure 2:
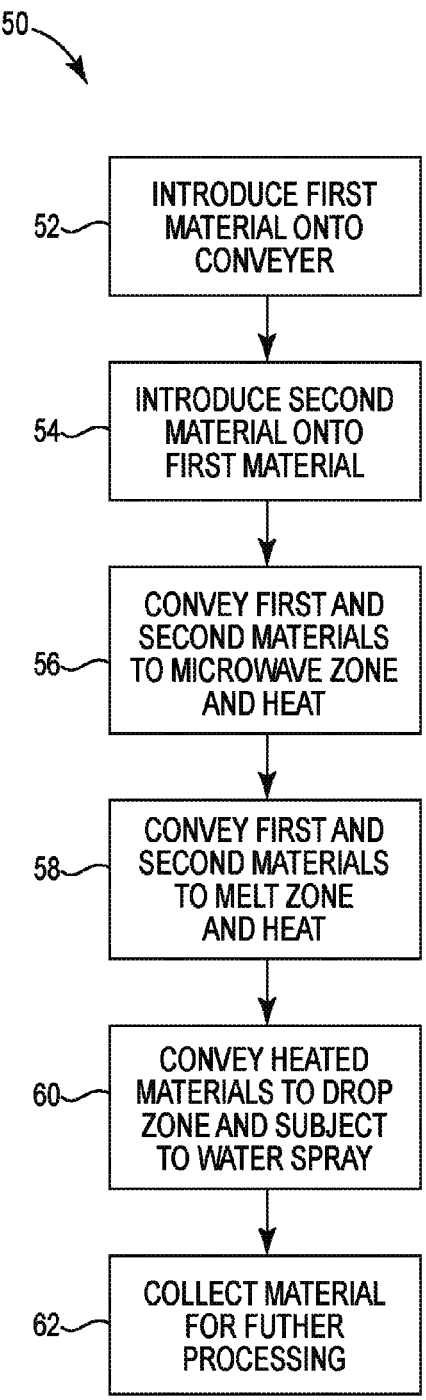
FIG. 2 is a flow diagram illustrating a material reducing process in accordance with one embodiment.

FIG. 2 is a flow diagram illustrating a mineral reduction process 50 in accordance with one embodiment. In one embodiment, process 50 is used to reduce iron ore to metallic iron by mixing the iron ore with a fluxing agent, a reducing agent, and a binder in order to produce an unfired pellet or briquette.

In process 50, a first material layer is introduced onto a conveyer, such as within furnace 10 above, at step 52. In one example, the first material layer is a ground limestone layer. Once on the conveyer, a second material layer is placed over the first material layer on the conveyer at step 54. In one example, the second material layer is an iron ore, such as a pelletized taconite ore. At step 56, the first and second material layers are conveyed through a microwave zone, where they are exposed to microwaves and heated.

In one example, the heating of the material layers will cause the second material layer, in one example the iron ore, to begin to reduce and metalize. At step 58 the first and second material layers are conveyed to a melt zone, where they are further exposed to heat, such as a traditional heat source like a gas furnace. This causes further reduction and metallization of the iron ore.

After the material is sufficiently reduced, it is conveyed to the drop zone at step 60. In one example, sufficient reduction occurs when 92% or higher metallization is achieved in the iron ore pellets. Also in one example, sufficient separation of iron from slag is achieved, in this case resulting in a silica content of the final pig iron product of 8% or less. At the drop zone, a cool water spray is directed at the heated material such that it spalls the hot slag and removes it from the iron nugget. At step 62, that material is collected for further processing.

In one embodiment, microwave pellet furnace 10 is used to roast ores from a waste stockpile, such as Oolitic Iron ore, Ferruginous Chert (Silicified hematite/magnetite mix), Banded Iron Formation (Silicified hematite/magnetite mix), Cretaceous Pebbles (Silicified hematite/magnetite mix), Taconite (Magnetite, hematite, and $SiO_2$), Natural Iron Ore (hematite), Dunka Pit type (Fe sulfides, hematite, magnetite), and Gold bearing Quartz (Au, Ag in $SiO_2$ matrix).

In one embodiment, microwave pellet furnace 10 is used to reduce minerals from a waste stockpile, such as Bauxite (Al hydroxides), Kaolinite ($Al_2Si_2O_5(OH)_4$), Kyanite ($Al_2SiO_5$), Andalusite ($Al_2SiO_5$), Topaz $Al_2SiO_4(F,OH)_2$), Sillimanite ($Al_2SiO_5$), Corundum ($Al_2O_3$), Orpiment ($As_2S_3$), Realgar (AsS), Barite ($BaSO_4$), Witherite ($BaCO_3$), Borax ($Na_2B_4O_5$(OH)$_4$-8H$_2$O), Tourmaline (B(Na—Ca—Al—Mg—Fe—Mn) silicate), Beryl ($Be_3Al_2(Si_6O_{18})$), Calcite ($CaCO_3$), Gypsum ($CaSO_4$-2H$_2$O), Dolomite ($CaMg(CO_3)_2$), Anhydrite ($CaSO_4$), Stilbite ($CaAl_2Si_7O_{18}$-7H$_2$O), Aragonite ($CaCO_3$), Apatite ($Ca_5(PO_4)_3$(F, Cl, OH)), Epidote ($Ca_2$(Al, Fe)Al$_2$O(SiO$_4$)—(Si$_2$O$_7$)(OH)), Malachite ($Cu_2CO_3(OH)_2$), Chrysocolla ($Cu_4H_4Si_4O_{10}(OH)_8$), Bornite ($Cu_5FeS_4$), Chalcopyrite ($CuFeS_2$), Pyrrhotite ($Fe_{1-x}S$), Magnetite ($Fe_3O_4$), Hematite ($Fe_2O_3$), Arsenopyrite (FeAsS), Siderite ($FeCO_3$), Chromite ($FeCr_2O_4$), Pyrite ($FeS_2$), Marcasite ($FeS_2$), Ilmenite ($FeTiO_3$), Wolframite ((Fe,Mn)WO$_4$), Goethite (aFeO(OH)), Limonite (Fe—OH nH$_2$O), Staurolite ($Fe_2A_{19}O_6(SiO_4)_4$—(O, OH)$_2$), Cinnabar (HgS), Muscovite (KAl hydrated silicate), Biotite (KMg hydrated silicate), Talc (Mg hydrate), Chlorite (MgFe hydrate), Serpentine ($Mg_3Si_2O_5(OH)_4$), Magnesite ($MgCO_3$), Spinel ($MgAl_2O_4$), Manganite (MnO(OH), Pyrolusite ($MnO_2$), Molybdenite ($MoS_2$), Halite (NaCl), Natrolite ($Na_2Al_2Si_3O_{10}$ 2H$_2$O), Galena (PbS), Anglesite ($PbSO_4$), Cerussite ($PbCO_3$), Stibnite ($Sb_2S_3$), Quartz ($SiO_2$), Opal ($SiO_2$-nH$_2$O), Cassiterite ($SnO_2$), Celestite ($SrSO_4$), Strontianite ($SrCO_3$), Rutile ($TiO_2$), Sphalerite (ZnS), Hemimorphite ($Zn_4(Si_2O_7)$(OH)$_2$—H$_2$O), Smithsonite ($ZnCO_3$), and Zircon ($ZrSiO_4$).

In one embodiment, microwave pellet furnace 10 is configured as a portable system. In one example, each of the components microwave pellet furnace 10 is configured compact enough to be carried on rail cars, such as one or more cars of a train, such that microwave pellet furnace 10 can be rolled over a rail directly to a waste stockpile for processing thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of heating a metal-containing material comprising:
    conveying a hearth layer of materials into a furnace;
    adding metal-containing materials to the hearth layer conveyed into the furnace;
    heating the metal-containing materials on the hearth layer with microwave radiation;
    subsequently heating the metal-containing materials on the hearth layer with a direct heat source, wherein the microwave heating and subsequently heating comprise heating to at least the melting temperature of at least one metal in the metal-containing materials; and
    after heating the metal-containing materials, cooling the heated metal-containing materials such that fractures are formed in the materials.

2. The method of claim 1, wherein the metal-containing materials consist of an ore and further comprising heating the metal-containing materials to at least a temperature where rapid reduction of the ore to a metal occurs.

3. The method of claim 1, wherein the metal-containing materials consist of an ore and further comprising heating the metal-containing materials to at least a temperature where oxidation of the ore to yield a metal oxide occurs.

4. The method of claim 1, wherein the metal-containing materials consist of iron ore pellets formed by mixing iron ore, a fluxing agent, a binding agent and a reducing agent, such that heating the metal-containing materials comprises heating the iron ore pellets until the iron ore pellets are reduced to crude pig iron and slag.

5. The method of claim 4, wherein the cooling of the heated metal-containing materials comprises cooling of the heated crude pig iron such that separation of crude pig iron from slag results in a silica content of the final pig iron product of 8% or less.

6. The method of claim 4 further comprising heating the iron ore pellet until the pellet is reduced to greater than 92% metallization.

7. A method of heating iron ore comprising:
conveying a hearth layer of materials into a furnace;
adding iron ore pellets to the hearth layer conveyed into the furnace;
heating the iron ore pellets on the hearth layer with microwave radiation;
subsequently heating the iron ore pellets on the hearth layer with a direct heat source until the iron ore pellets are reduced to crude pig iron and slag; and
after heating the iron ore pellets, cooling the heated crude pig iron and slag such that the cooled slag becomes brittle and fractures from the crude pig iron.

8. The method of claim 7 further comprising:
prior to adding the iron ore pellets to the hearth layer, forming the iron ore pellets by mixing iron ore, a fluxing agent, a binding agent and a reducing agent.

9. The method of claim 7, wherein the cooling of the heated crude pig iron is such that separation of iron from slag results in a silica content of the final pig iron product of 8% or less.

10. The method of claim 7 further comprising heating the iron ore pellet until the pellet is reduced to greater than 92% metallization.

11. The method of claim 7 further comprising heating the iron ore pellet to at least the melting temperature of the iron ore.

* * * * *